Dec. 6, 1966 SATOSHI SHIMADA 3,290,435

COLOR TELEVISION REPRODUCING SYSTEM

Filed Oct. 4, 1963 2 Sheets-Sheet 1

Inventor
Satoshi Shimada by Hill, Sherman, Meroni, Gross & Simpson
Attys.

Dec. 6, 1966 SATOSHI SHIMADA 3,290,435

COLOR TELEVISION REPRODUCING SYSTEM

Filed Oct. 4, 1963 2 Sheets-Sheet 2

Inventor
Satoshi Shimada by Hill, Sherman, Meroni, Gross & Simpson
Attys.

United States Patent Office 3,290,435

Patented Dec. 6, 1966

3,290,435

COLOR TELEVISION REPRODUCING SYSTEM

Satoshi Shimada, Tokyo, Japan, assignor to Sony Corporation, Tokyo, Japan, a corporation of Japan Filed Oct. 4, 1963, Ser. No. 313,837
Claims priority, application Japan, Oct. 13, 1962, 37/45,425
4 Claims. (Cl. 178—5.4)

This invention relates to a color television reproducing system developed for the general object of providing a system which is comparatively simple in construction and operation, having a minimum number of components, but which is highly reliable and efficient, producing an image in which the colors are clear and distinct, with high brightness and with high resolution.

Systems are known wherein a type of cathode ray reproducing tube is used having a screen including side-by-side fluorescent strips of three or more colors with two grids placed adjacent the screen in a manner such that a cathode ray beam may be impinged on a strip of a selected color by control of the relative potentials of the grids. In such systems, a sub-carrier signal of 3.58 megacycles, for example, may be applied to the two color control grids while applying to the control grid-cathode circuit of the cathode ray tube a composite signal including a luminance component and color components on certain phases of the sub-carrier which is suppressed from the composite signal.

In addition, such prior systems have included means for applying a signal including keying pulses to the control grid-cathode circuit of the cathode ray tube to effectively blank out the tube during certain portions of each cycle of the sub-carrier wave signal. Such blanking is necessary in an attempt to obtain accurate color reproduction with vivid colors, due to an inherent relationship in the operation of the color control grids in relation to the fluorescent strips. Circuits have been proposed for controlling the duration of keying pulses in accordance with the saturation of the color or chrominance signal and while theoretically such control should produce advantages, the circuits as proposed have apparently not been satisfactory, particularly with respect to production of satisfactory colors at all levels of color saturation, avoiding adverse effects from noise and extraneous signals, and obtaining rapid response to changes in degree of color saturation.

According to this invention, the amplitude of the keying signal is changed in accordance with the saturation of the chrominance signal, to change the energy of the electron beam impinged on the fluorescent screen. When the color saturation is high, the keying signals are applied at high amplitudes to obtain accurate reproduction of vivid color, while when the color saturation is reduced to intermediate or low levels, the keying signals are of correspondingly reduced amplitudes to produce less vivid colors with high accuracy and with increased picture brightness, reduced aberration of the electron beam and increased reproduction of fine picture detail.

An important feature of the invention is in the provision of a biasing or cut-off level circuit wherein the amplitude of the keying signal increases above a certain level in proportion to the amount by which the amplitude of the chrominance components exceed the level determined by the biasing or cut-off level circuit. With this arrangement, the effect of noise and extraneous signals is greatly reduced, while retaining the inherent advantages of the amplitude modulation of the keying signal.

A further important feature of the invention is in the provision of a comparatively simple but very reliable and efficient circuit, wherein a single amplifier device serves to provide amplitude and modulation of the keying signal and also serves as a frequency multiplier or harmonic generator in developing the keying signal. In one preferred embodiment, the amplifier device is in the form of a triode vacuum tube, while in another preferred embodiment a pentode vacuum tube is used.

This invention contemplates other and more specific objects, features and advantages which will become more fully apparent from the detailed description taken in conjunction with the accompanying drawings which illustrate preferred embodiments and in which.

As shown on the drawings.

Figure 1:
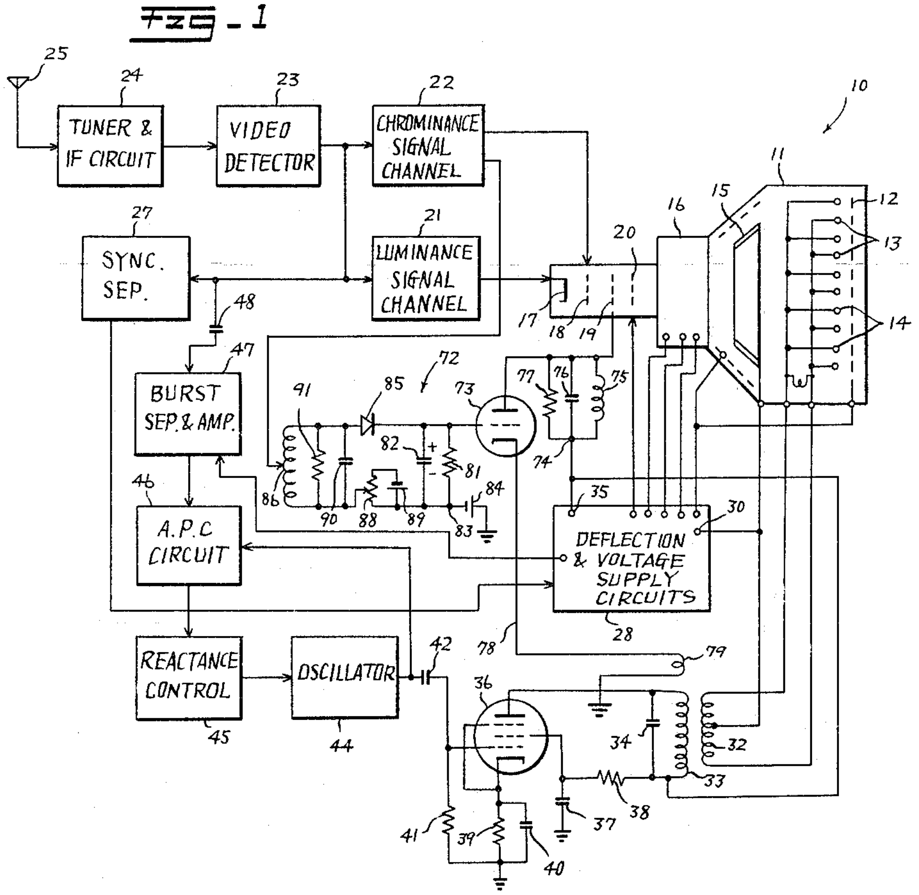
FIGURE 1 is a schematic diagram illustrating a color television reproducing system constructed according to the principles of this invention.

Referring to FIGURE 1, reference numeral 10 generally designates a color television reproducing system constructed according to the principles of this invention. The system 10 is particularly designed for receiving and reproducing signals of the NTSC system, but it will be understood that it has other applications.

In general, the system 10 comprises a cathode ray reproducing tube 11 of the type having a fluorescent screen 12 composed of fluorescent strips or stripes of three colors and two groups of grids 13 and 14 adjacent the screen 12 for controlling the impingement of a cathode ray beam on the screen 12 in a manner to control color, this type of tube being well known in the art and being referred to as the chromatron tube or Lawrence tube. The tube 11 further includes an acceleration electrode 15, a deflection coil assembly 16 and an electron gun including a cathode 17, a control grid 18, an accelerating grid 19, and a focus control grid 20. The cathode 17 is connected to the output of a luminance signal channel 21 while the control grid 18 is connected to an output of a chrominance signal channel 22, inputs of the channel 21 and 22 being connected to the output of a video detector 23 which in turn is connected to the output of a tuner and IF amplifier circuit 24 connected to an antenna 25.

The output of the video amplifier 23 is also applied to a synchronizing signal separating circuit 27 which applies a signal to a deflection and voltage supply circuit 28 having a terminal connected to the grid 20, additional terminals connected to the deflection coil assembly 16, a high voltage terminal connected to the screen 12 and a medium voltage terminal 30 connected to the electrode 15. The construction and operation of the synchronizing signal separating circuit 27 and the deflection and voltage supply circuits 28 are, of course, well known in the art and it will be understood that an electron or cathode ray beam produced by the elements 17–20 and accelerated under the influence of the high voltages applied to the screen 12 and electrode 15 is caused to periodically scan the screen 12 under the influence of the deflecting fields produced by the deflection coil assembly 16.

The instantaneous color produced as the beam impinges on a screen 12 is controlled from a color control signal applied to the grid structures 13 and 14 from the end terminals of a coil 32 having a center tap connected to the medium voltage terminal 30 of the circuit 28. The coil 32 is inductively coupled to the tank circuit of an oscillator including a primary coil 33 connected in parallel with a capacitor 34 between a B+ terminal 35 of the voltage supply circuit 28 and the plate or anode of a pentode oscillator tube 36. The screen grid of the tube 36 is connected through a capacitor 37 to ground and through a resistor 38 to the B+ terminal 35, while the cathode thereof is connected to the suppressor grid thereof and also to ground through the parallel combination of a resistor 39 and a capacitor 40.

The control grid of the tube 36 is connected through a resistor 41 to ground and through a coupling capacitor 42 to the output of an oscillator 44 which may preferably be operated at a frequency 3.58 megacycles.

In a manner known in the art, the operation of the oscillator 44 is synchronized with a color burst component of the video signal. As illustrated, the oscillator is controlled from a reactance control circuit 45 which is controlled from an automatic phase control circuit 46 having one input connected to the output of the oscillator 44 and a second input connected to the output of a burst separating and amplifying circuit 47. The input of the circuit 47 is connected through a coupling capacitor 48 to the output of the video detector and in conventional fashion, a gating pulse may be applied to the circuit 47 from the deflection and voltage supply circuit 28, through a line 49. It will be understood that the circuits 44–47 are conventional and other forms of circuits may be used.

Figure 2:
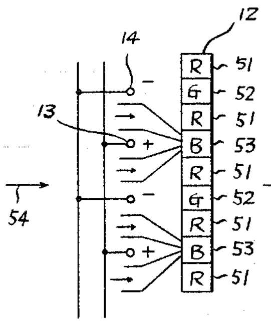
FIGURE 2 illustrates schematically a portion of the screen structure of a reproducing tube of the system of FIGURE 1, and the paths taken by electrons of the beam thereof under one condition of operation.

Before further describing in detail the circuits of this invention, the operation of the tube 11 will be considered. FIGURE 2 diagrammatically illustrates a portion of the screen 12 and the relationship of elements of the grids 13 and 14 thereto. As illustrated, the screen 12 is composed of red, green and blue strip phosphors 51, 52 and 53, arranged in an order such that there are successively a red (R) phosphor 51, a green (G) phosphor 52, then another red (R) phosphor 51, then a blue (B) phosphor 53, then another red (R) phosphor 51, then another green (G) phosphor 52 and so on. The grid elements 13 and 14 are arranged parallel to the strip phosphors, are spaced apart a distance equal to twice the spacing between the centers of the phosphors, and are arranged in a predetermined relationship thereto. As illustrated, each of the grid elements 13 may be disposed opposite a blue phosphor strip 53, while each of the grid elements 14 may be disposed opposite a green phosphor strip 52, all of the red phosphor strips 51 being thereby positioned intermediate the grid elements.

The arrangement is such that the instantaneous color produced by the impingement by a cathode ray beam on the screen 12 may be controlled by controlling the relative potentials of the grid elements 13 and 14. For example, as shown in FIGURE 2, a blue color may be produced by making the elements 13 positive relative to the elements 14. The electrons of a beam approaching from the left, as indicated by arrow 54, are then attracted by the positive elements 13 while being repelled by the negative elements 14 to impinge only on the blue phosphors 53.

Figure 3:
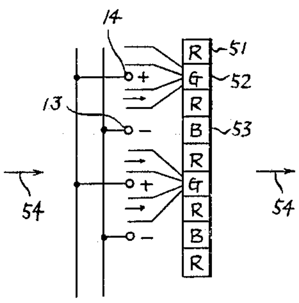
FIGURE 3 is a view similar to FIGURE 2, except illustrating a second condition of operation.

As shown in FIGURE 3, under opposite conditions with the grid elements 13 negative and the grid elements 14 positive, the electrons of the beam are attracted by the elements 14 and repelled by the negative elements 13 to impinge on the green phosphor strips 52.

Figure 4:
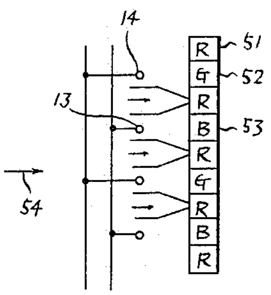
FIGURE 4 is another view similar to FIGURE 2, illustrating a third condition of operation.

FIGURE 4 shows the operation when the grid elements 13 and 14 are at the same potential, the electrons of the beam being impinged only on the red phosphor strips 51.

Figure 5:
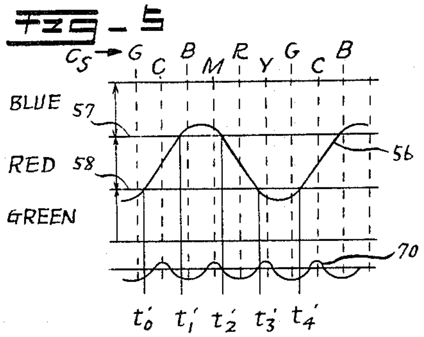
FIGURE 5 is a graph illustrating the wave form of the color control signal applied to the color control grids of the reproducing tube of the system of FIGURE 1, and also illustrating the form of the keying wave applied thereto.
Figure 6:
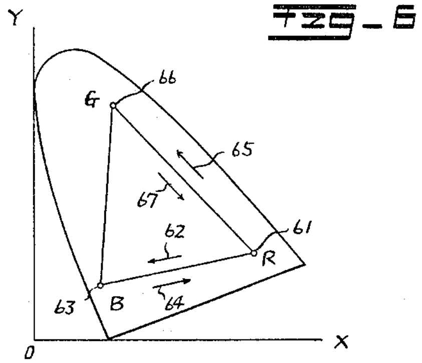
FIGURE 6 is a chromaticity diagram for explaining the operation of a system.

Referring now to FIGURE 5, reference numeral 56 indicates the sinusoidal form of color control signal applied to the grids 13 and 14. As diagrammatically illustrated, when the relative potential of one grid (grid 13) rises above a certain level as indicated by line 57, the blue color is produced, while the green color is produced when the potential drops below another level 58, the red color being produced at intermediate levels, it being understood that the line of demarkation between the colors is not sharp with a gradual change from one hue to another being produced as the potential is changed. In general, however, it may be considered that the red color is produced from a time $t_0$ to a time $t_1$, the blue color from time $t_1$ to time $t_2$, the red color again from time $t_2$ to time $t_3$, and the green color from time $t_3$ to time $t_4$ at which time another cycle is initiated. Thus with reference to the chromaticity diagram of FIGURE 5, the operation moves from a red point 61 thence in the direction of arrow 62 to a blue point 63, thence back in the direction of arrow 64 to the initial red point 61, thence in the direction of arrow 65 to a green point 66, and thence back in the direction of arrow 67 to the initial red point 61.

This operation, however, is not satisfactory when the hue of the chrominance signal on the 3.58 mc. sub-carrier changes in the order of red, green, blue, red, green, blue, etc., as is the case in the standard NTSC signal. The change in hue in such a signal, indicated as $C_s$ is shown at the top of FIGURE 5 wherein B, R and G indicate blue, red and green and C, M and Y indicates cyan, magenta and yellow. To produce accurate color reproduction, it has been the practice to apply a keying signal in the grid-cathode circuit of the reproducing tube to produce an effective blanking action as indicated by wave form 70 in the lower portion of FIGURE 5. With this signal, the tube is blanked at points corresponding to the application of the cyan, magenta and yellow portions of the chrominance signal. The keying signal may be produced by generating a third harmonic of the main color control signal 56, so as to have a frequency of approximately three times 3.58 mc. or 10.7 mc.

In prior art systems, the keying signal 70 is applied into the electron gun of the reproducing tube at a certain constant level sufficient to substantially prevent emission of the electron beam from the gun, and the level does not depend upon the degree of saturation of the chrominance signal. Accordingly, even if the chrominance signal has a low saturation such as for example when the color is pure white, the keying action remains the same. However under such conditions, the keying action is not necessary, and removal of the keying signal would greatly increase both luminosity and resolution. On the other hand, the color saturation is high, the keying signal must be applied accurately and at a relatively high level in order to effectively suppress deterioration of color purity. Because of the fact that the electron beam is turned completely off by the keying signal even when the color saturation is low, many disadvantages result including the reduction in luminosity and resolution, the production of a large amount of a momentary beam, a large diameter of a beamflux, aberration focus, etc.

Circuits have been proposed to control the duration of keying pulses in accordance with the saturation of the chrominance signal, and while theoretically such control should produce advantages, the circuits proposed have apparently not been satisfactory, particularly with respect to production of satisfactory colors at all levels of color saturation, avoiding adverse effects from noise and extraneous signals, and obtaining rapid response to changes in degree of color saturation.

According to this invention, the amplitude of the keying signal is changed in accordance with the saturation of the chrominance signal, to change the energy of the electron beam impinged on the fluorescent screen. When the color saturation is high, the keying signals are applied at high amplitudes to obtain accurate reproduction of vivid colors, while when the color saturation is reduced to intermediate or low levels, the keying signals are of correspondingly reduced amplitudes to produce less vivid colors with high accuracy, and with increased picture brightness, reduced aberration of the electron beam and increased reproduction of fine picture detail.

As shown in FIGURE 1, a circuit 72 is provided for applying a keying signal to the electron gun of the color reproducing tube 11, controlled in amplitude in accordance with the saturation of the color signal. In particular, the grid 19 is connected to the anode of a triode 73 and through a tank circuit 74 to the B+ terminal 35. Tank circuit 74 comprises an inductor 75 and a capacitor 76 and may also include a parallel resistor 77 for obtaining reduced effective Q and improved shaping of the keying pulses.

The cathode of the triode 73 is connected through a line 78 to one terminal of a coil 79 the other terminal of which is grounded. Coil 79 is inductively coupled to the coil 33 to apply a signal at a frequency of 3.58 mc. in the cathode circuit of a triode 73. Triode 73 is operated non-linearly and the tank circuit 74 is tuned to the third harmonic frequency, to develop keying pulses at a frequency of approximately 10.7 mc., such pulses being applied to the grid 19 to reduce the energy of the electron beam.

The amplitude of the keying pulses is controlled by applying to the grid of the triode 73 a D.C. signal proportional to the amplitude of the chrominance signal. In particular, the grid of the triode 73 is connected through the parallel combination of a resistor 81 and a capacitor 82 to a circuit point 83 connected to ground through a bias battery 84. The grid is additionally connected through a diode 85 to one terminal of a coil or inductor 86 having a tap connected through a line 87 to an output of the chrominance signal channel 22. The other terminal of the coil 86 is connected to the movable contact of a potentiometer 88 connected across a battery 89 one terminal of the battery being connected to the circuit point 83. A capacitor 90 is connected in parallel with the inductor 86 to provide a circuit tuned to the mid-frequency of the color signal component, a resistor 91 being additionally connected in parallel to obtain the required band width characteristics.

In operation, the color signal components are rectified by the diode 85 to produce a D.C. signal across the capacitor 82 having a polarity as indicated on the drawing, to move the potential of the grid of the triode 73 in a positive direction in response to increased amplitude of color signal components, and to thereby increase the amplitude of the keying pulses without substantially affecting the shaping thereof.

The battery 89 applies a biasing voltage which regulates the color signal level at which the diode 85 starts to function to develop the control signal, such color signal level being adjustable by means of the potentiometer 88. This feature greatly improves the operation of the circuit, particularly when the level of noise signals is high.

Figure 7:
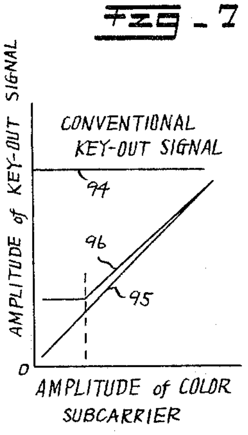
FIGURES 7, 8 and 9 are graphs for explaining the operation of the system of this invention and its advantages.
Figure 8:
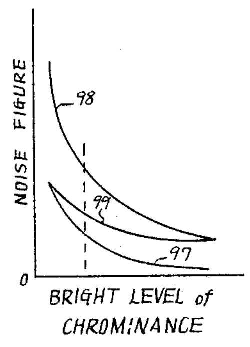
Figure 9:
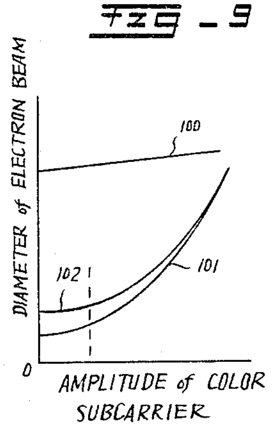

The operation of the circuit may be clarified by reference to FIGURES 7, 8 and 9. In FIGURE 7, the keying signal amplitude is plotted as the ordinate against the amplitude of the color sub-carrier signal as abscissa. Line 94 shows the conventional case of the prior art, wherein the amplitude of the keying signal is constant. Line 95 shows the operation with the circuit of this invention, but with the cut-off level circuit 88, 89 inoperative. In this case, the amplitude of the keying signal is directly proportional to the amplitude of the color sub-carrier. Line 96 shows the operation of the circuit of this invention, with the cut-off level circuit 88, 89 being operative. In this case, the amplitude of the keying signal is constant up to a certain amplitude of the color sub-carrier and thereafter increases in direct proportion to the amplitude of the color sub-carrier.

FIGURE 8 is a plot of a noise figure against the brightness level of the chrominance signal, the noise figure being a figure representing the adverse effect of the noise signals on the reproduction of the picture. Without the circuit of this invention, the adverse effect of noise is determined primarily by the ratio of the luminance signal level to the noise signal level, but it decreases to some extent as the chrominance signal increases, resulting in a curve as indicated by reference numberal 97.

With the circuit of this invention operation, but without the cut-off level circuit 88, 89 thereof, the noise signals may exceed the chrominance signals at low brightness levels thereof, to produce across the capacitor 82 a signal corresponding to the envelope of the noise signals. This signal, in being used to modulate the amplitude of the keying signal, produces a noticeable change in the reproduced picture, and hence a high noise figure is obtained at low brightness levels of the chrominance signal. At higher brightness levels, however, the chrominance signal predominates over the noise, and the noise figure is greatly reduced. Accordingly, a curve is obtained as indicated by reference 98 in FIGURE 8.

With the circuit of this invention in operation, including the cut-off level circuit 88, 89, the effect of noise at low brightness levels of the chrominance signal is about the same as with prior art circuits and it is reduced somewhat as the brightness level of the chrominance signal increases, thereby resulting in a curve as indicated by reference 99.

FIGURE 9 is a plot of the diameter of the electron beam against the amplitude of the color sub-carrier. Line 100 shows the operation with prior circuits, wherein the amplitude of the keying signal is at a constant relatively high level, to produce a large diameter of the electron beam. Line 101 shows the operation of the circuit of this invention, but without the cut-off level circuit 88, 89, wherein the diameter of the beam is very small at low amplitudes of the color sub-carrier, and increases gradually as the amplitude of the color sub-carrier is increased. Line 102 shows the operation of the circuit of this invention, with the cut-off level circuit 88, 89 operative, wherein the diameter is somewhat higher at low amplitudes of the color sub-carrier, as compared to the operation without the cut-off level circuit 88, 89, but is still quite low as compared to the operation of the circuits of the prior art. At higher amplitudes of the color sub-carrier, the line 102 follows the line 101 closely.

Accordingly, the circuit of this invention provides increased brightness and greatly increased result in power at low amplitudes of the color sub-carrier. In addition, with the cut-off level circuit 88, 89 in operation, the effect of noise is not substantially different from the effect in prior art circuits. It is also noteworthy that with the circuit including the triode 73 operating as a combined harmonic generator or frequency multiplier and amplitude modulation circuit, the circuit arrangement is quite simple and uses a minimum number of component parts. Additionally, only the one tank circuit 74 is required, the effect of temperature variations is minimized, and aberrations in phase are also minimized.

Figure 10:
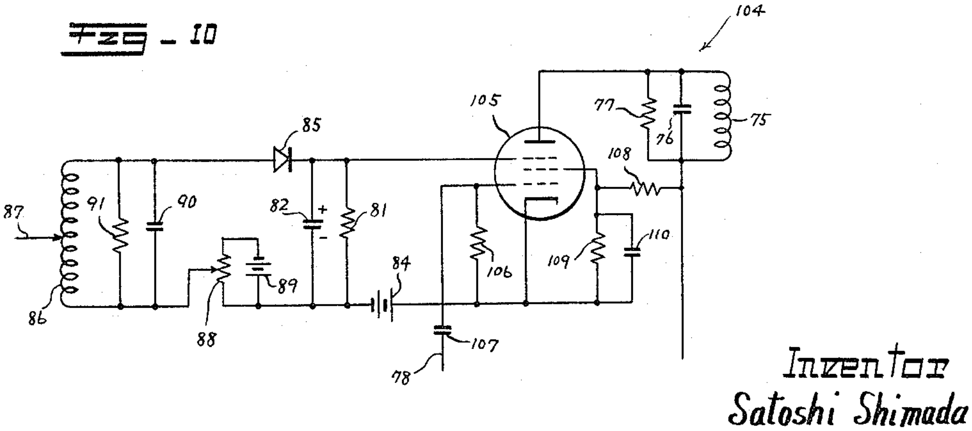
FIGURE 10 illustrates a modified circuit constructed according to the principles of this invention.

FIGURE 10 shows a modified circuit 104 constructed according to the invention, wherein a detector circuit is used having components 81–91 which are substantially the same as those of the circuit 72 described above. In the circuit 104, however, the output of the detector circuit is applied to the suppressor grid of a pentode 105 having a cathode which is grounded and having a control grid connected through a resistor 106 to ground and through a capacitor 107 to the line 78 which is connected to one terminal of the coil 79 as shown in FIGURE 1. The plate or anode of the pentode 105 is connected to the grid 19 of the reproducing tube 11 and also through the tank circuit 74 to the B+ terminal 35. The screen grid of the pentode 105 is connected through a resistor 108 to the B+ terminal and through a resistor 109 to ground, a capacitor 110 being connected across the resistor 109. This circuit operates in substantially the same way as the circuit 72 as above described, the amplitude of the keying signal being modulated in accordance with the saturation of the color signal. The circuit including the pentode 105 operates as a combined amplitude modulator circuit and harmonic generator or frequency multiplier, and only the one tank circuit 74 is required.

It will be apparent that the invention may be applied to circuits using other types of reproducing tubes such as, for example, one having a single electron gun with a fluorescent screen composed of red, green and blue strip phosphors, arranged in an order and continuation of red, green and blue in sequence, and with conductive wire arranged opposite to alternate strip phosphors and parallel therewith, the respective wires being arranged corresponding to red, green and blue and being respectively connected together to form three grid groups of a three phase system. It will also be apparent that the cut-off action obtained with the use of the circuit 88, 89 may be performed by other means.

It will be understood that other modifications and variations may be effected without departing from the spirit and scope of the novel concepts of this invention.

I claim as my invention:

1. In a color television system, means for supplying a composite color television signal including a luminance component and color components on phases of a sub-carrier wave, means for generating a control signal at the frequency of the sub-carrier wave and synchronized therewith, a reproducing tube having color control means responsive to said control signal to produce main colors in certain portions of each cycle of said control signal and mixed colors intermediate said main colors in other portions of each cycle, means for applying to said tube a keying signal having pulses therein for reducing brightness during said other portions of each cycle of the control signal, a biasing circuit for establishing a certain signal level, and means coupled to said biasing circuit and responsive to said color components of said composite signal for increasing the amplitude of said keying signal in proportion to the amount by which the amplitude of said color components exceed said certain signal level.

2. In the color television system as claimed in claim 1 and in which said means responsive to said color components of said composite signal for increasing the amplitude of said keying signal comprises an amplifying device having input and output terminals with the input terminals coupled to the control signal and said output terminals coupled to a tank circuit whereby said keying signals are developed in said tank circuit.

3. The color television system as claimed in claim 1 in which said amplifying device is a vacuum tube including a cathode, an anode and a grid and said biasing circuit biases said vacuum tube for non-linear operation.

4. The color television system as claimed in claim 1 in which said means responsive to said color component of said composite signal for increasing the amplitude of said keying signal comprises only one electron tube having a cathode, an anode and a control grid.

References Cited by the Examiner

UNITED STATES PATENTS

| | | | |
|---|---|---|---|
| 2,745,899 | 5/1956 | Maker et al. | 178—5.4 |
| 2,813,200 | 11/1957 | Heber | 332—66 |
| 3,002,049 | 9/1961 | Loughlin | 178—5.4 |
| 3,084,212 | 4/1963 | Raibourn | 178—5.4 |

DAVID G. REDINBAUGH, *Primary Examiner.*

J. A. O'BRIEN, *Assistant Examiner.*